Nov. 11, 1947.  H. J. DUPHILY  2,430,761
LATHE CHUCK
Filed Feb. 20, 1945  4 Sheets-Sheet 2

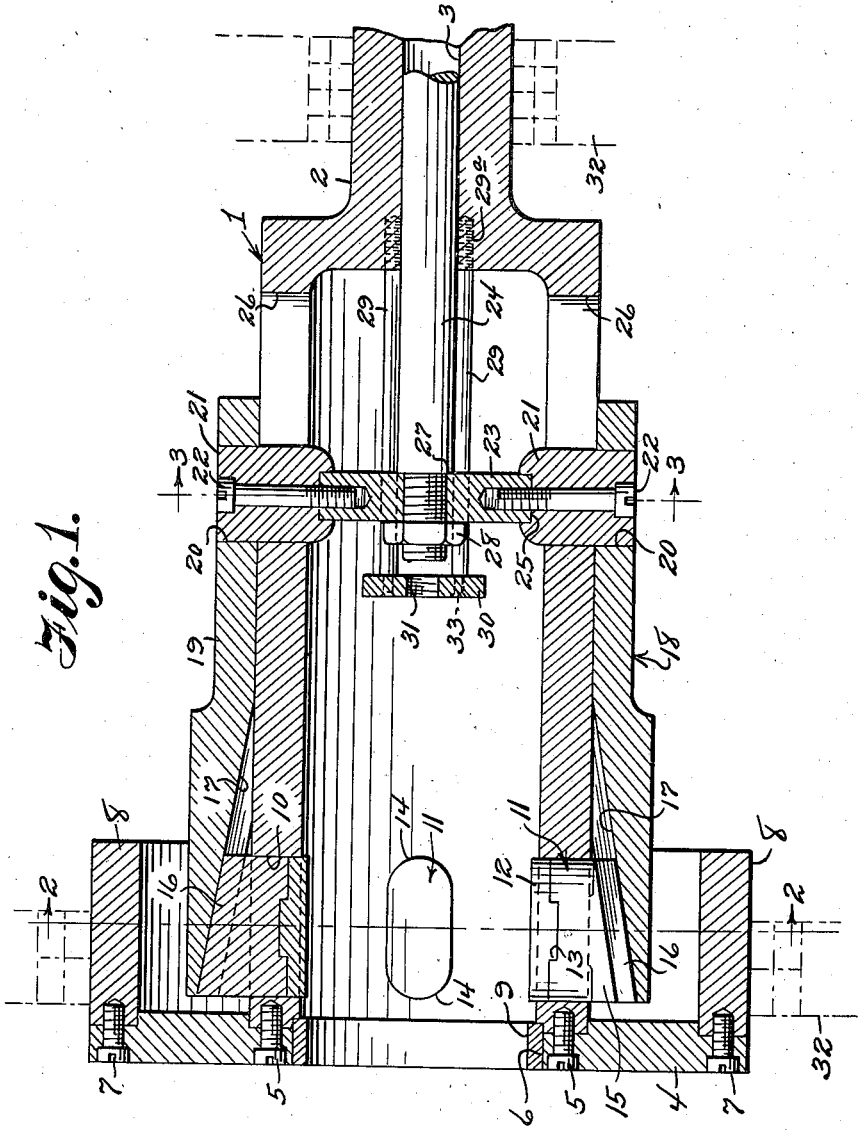

INVENTOR.
Henry J. Duphily
BY Victor J. Evans & Co.
ATTORNEYS

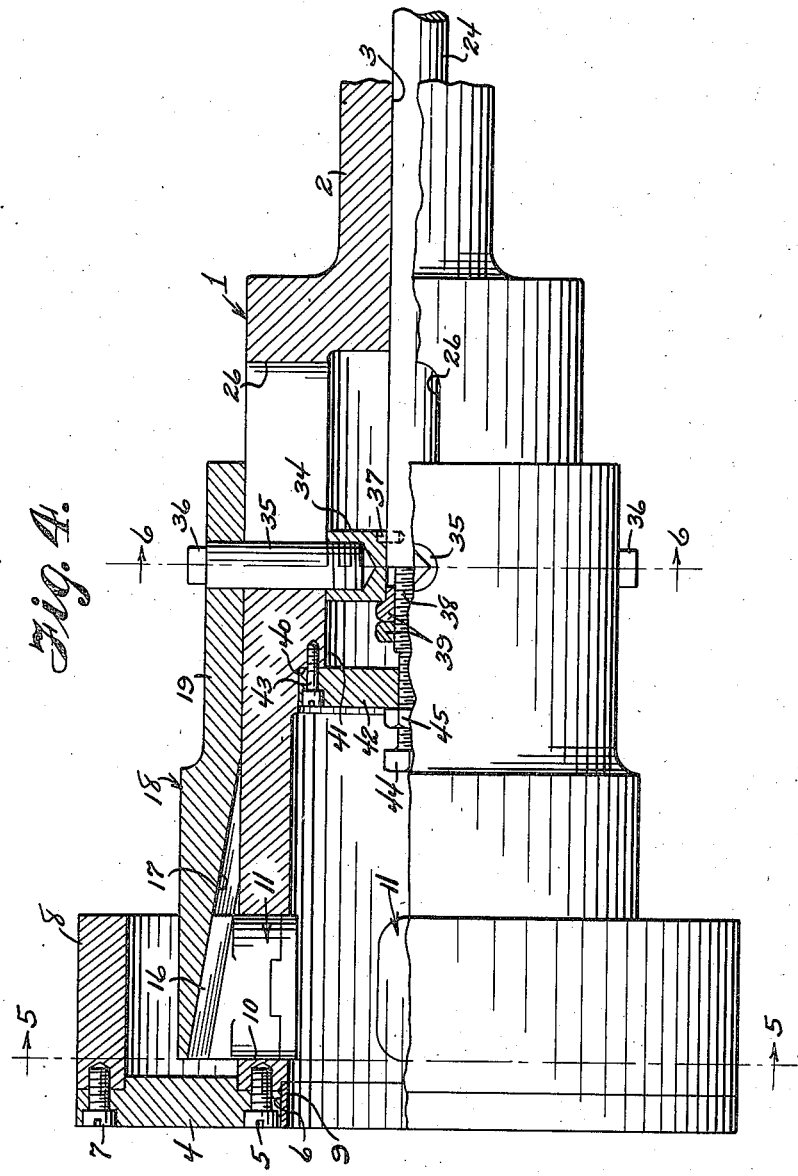

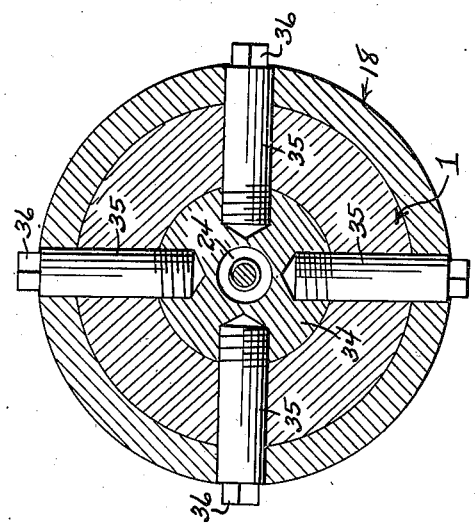
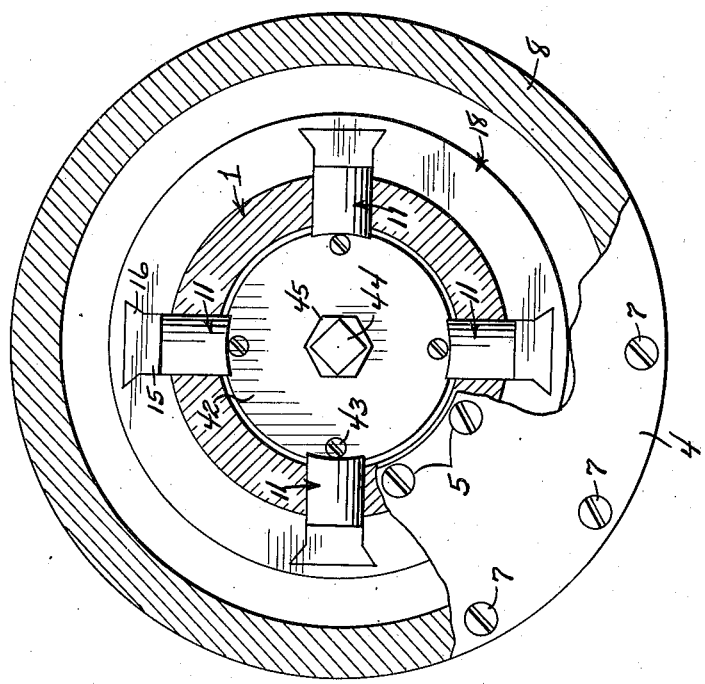

Patented Nov. 11, 1947

2,430,761

UNITED STATES PATENT OFFICE 2,430,761

LATHE CHUCK

Henry J. Duphily, Port Arthur, Tex.

Application February 20, 1945, Serial No. 578,909

1 Claim. (Cl. 279—74)

My present invention, in its broad aspect, has to do with improvements in chucks for various types of metal working machines, and more particularly, it is my purpose to provide a chuck which has unique and improved jaws and operating means, therefore to the end that such jaws move radially with respect to the axis of the spindle; that is, at right angles to the longitudinal axis of the spindle, and recede into the body of the spindle to give a smooth, obstruction free path for the work to slide into the spindle, and prevent accumulation of dirt, chips and the like. Furthermore, since the jaws have no movement longitudinally of the spindle and remain the same distance from the work stop, the work is clamped by the jaws at the same point and at the same distance from the end of the spindle. In addition to the above, my jaws have a dovetailed connection with the dovetailed slots in the jaw actuating ring thereby to be securely retained, and the wedging faces of the jaws and the grooves in the ring insure a firm, strong and even pressure on the jaws. I also provide a novel and improved actuating device for the actuating or clamping ring, and an improved stop for the work to be used as a reference point so that in production work all work may be clamped the same distance in the chuck. My jaws are provided with improved inserts or adapters to permit handling of different sizes of work and to insure accurate concentric engagement of the jaws with the work.

In addition to the above objects and advantages, my stop is provided with a threaded center hole to receive a bolt with a jam nut to be used as a stop, and the face plate is provided with a removable bushing or insert to take the wear at the point where the work passes through the opening in the face plate, furthermore, the follower or connecting posts for the jaw activating ring are removable, and the stroke of the actuating rod and plate carrying the followers or connecting posts is determined by the length of the slots in the spindle body.

Other and equally important objects and advantages of my invention will be apparent from the following description and drawings, but it is to be understood that changes in form, size, shape, construction and arrangement of parts is permissible and within the purview of my broad inventive concept and the scope of the appended claim.

In the drawings wherein I have illustrated a preferred form of my invention:

Figure 1 is a longitudinal section;

Figure 4 is a side elevation, partly in section, of a modified form of my chuck;

Figure 5 is a transverse section on the line 5—5 of Figure 4, and

Figure 6 is a transverse section on the line 6—6 of Figure 4.

In the drawings wherein like characters of reference are used to designate like or similar parts throughout the several views:

Figure 3:
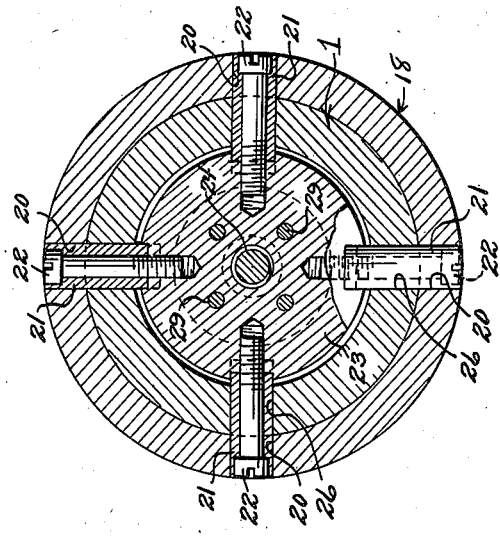
Figure 3 is a transverse section on the line 3—3 of Figure 1.
Figure 2:
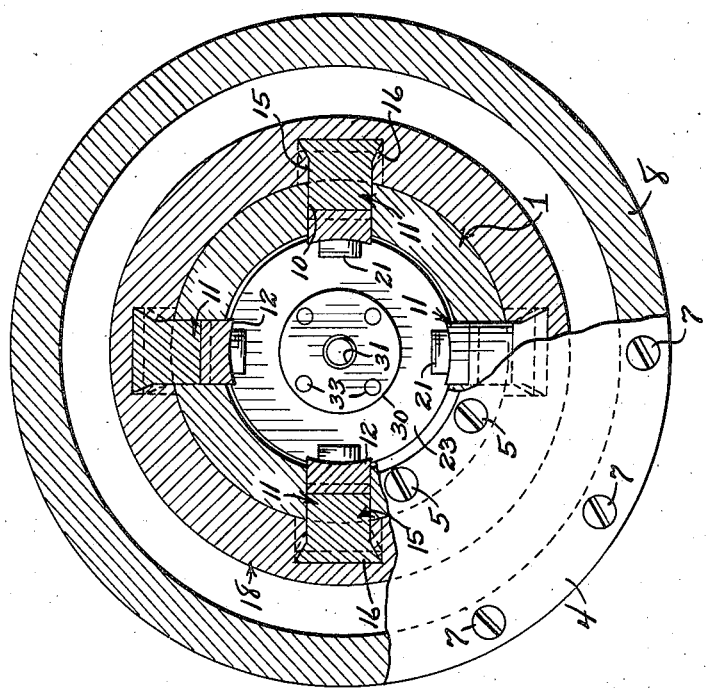
Figure 2 is a transverse section on the line 2—2 of Figure 1.

The numeral 1 designates the hollow spindle which has a shank 2 formed with a longitudinal bore 3. Attached to the open end of the spindle 1 is a face plate 4, a plurality of countersunk bolts 5 being used for the purpose. The face plate 4 has a center opening 6 and has bolted as at 7 to its rear countersunk peripheral edge a backwardly extending annular flange or scarf 8 which forms a hood about and spaced from the end of the spindle. A removable insert band or bushing 9 is mounted about the edge of the opening 6 in the face plate to take any wear or the like occasioned by insertion of the work (not shown) through the opening and into the spindle.

At a point adjacent its front end the spindle body is formed with four diametrically opposed circumferentially aligned elongated slots 10, within which are slidably received the jaws 11. All the jaws have the same form and construction and each has a removable adapter or insert 12 on its working face. The adapters may be of different size to take different sized work and they function to insure concentric engagement of the jaws on the work, and each has a center rib 13 fitting in a groove in the jaws, as shown in Figure 1. The jaws have rounded ends 14—as do the slots 10—and each jaw has an inwardly inclined head 15 and rib 16 fitting in the inclined dovetail slots 17 in the forward part of the inner wall of the jaw actuating ring or sleeve 18 which slides on the outer face of the body of the spindle. Cooperation of the sliding faces of the jaws and ring grooves urges the jaws inwardly and outwardly as the ring is moved toward or away from the end of the spindle. The ring 18 is reduced in thickness as at 19 about midway of its length and has four circumferentially aligned and diametrically opposed openings 20 through which are received the four operating posts 21.

The operating posts have the same construction and each is axially bored to receive a bolt 22 by which it is attached to the periphery of a circular plate 23 carried on the end of the operating shaft or rod 24. Each post is slotted as at 25 at its base to receive the edge of the plate therein as shown in Figure 1, and the bolts 22 are countersunk. The posts pass through and slidably operate in four elongated circumferentially aligned diametrically opposed slots 26 in the body of the spindle 1.

The operating rod or shaft 24 is designed to be connected with suitable pushing and pulling means such as a pneumatic or hydraulic piston and cylinder assembly (not shown), and has its end slightly reduced and threaded to form a shoulder 27 against which the plate 23 bears and is held in place by a nut 28. Mounted on four posts 29 adjustably threaded into the butt of the spindle as at 29ª at four diametrically opposed and circumferentially aligned and extending through openings in the plate 23, is an annular stop plate 30 which has a central threaded bore 31 to receive a bolt or the like (not shown). The shank of the spindle is adapted to be mounted in any type of metal working machine, indicated at 32 by dotted lines. Screws 33 are used to attach the plate 30 to posts 29.

In operation, the work is placed in the spindle and the operating rod 24 is moved to slide the ring 18 along the spindle whereupon the angular or wedging faces of the ring and jaws moves the jaws against the work to securely clamp the work in place. The stop limits the distance the work is inserted in the spindle and in order to fix work of different sizes in the spindle, different adapters can be placed on the jaws.

In Figure 4, the rod 24 has a collar 34 into which are threaded posts 35. The posts have squared heads 36 and the collar 34 is fixed in place by set screws 37. The rod is reduced and threaded at 38 and lock nuts 39 are carried thereon. Seated on a shoulder 40, formed by an enlarged part 41 of the spindle, is a plate 42 and bolts 43 are provided to hold the plate in place. The threaded reduced end 44 of the spindle forms a stop and has a nut 45 thereon. The operation of this form of my invention is the same as defined with reference to the form of Figure 1.

From the foregoing it is believed that the operation and advantages of my invention will be apparent, but it is again emphasized that the scope of my invention should only be conclusive when made in the light of the subjoined claim.

I claim:

A chuck comprising a hollow spindle, a face plate conforming to the shape of and secured to the open end of the spindle, a backwardly extending annular flange secured to the peripheral edge of said face plate to form a hood about and spaced from the end of said spindle, a medial opening in said face plate, a bushing in said opening, a shank on said spindle, having a longitudinal bore communicating with the interior of said spindle, a first set of diametrically opposed and circumferentially alined openings in said spindle, jaws mounted in said openings for sliding and radial movement transversely of said spindle, camming faces on said jaws, heads on said jaws, dovetail ribs on said heads inclined rearwardly toward the rear of the spindle, a ring mounted for sliding movement longitudinally of the spindle, dovetail grooves on said ring, said jaws and said ring having cooperating angular faces and the ribs on said jaws receivable in the grooves in said ring whereby the jaws are retained by the ring and moved radially of the spindle on longitudinal movement of the ring, a second set of diametrically opposed and circumferentially alined slots in said spindle, pins slidable in the slots in a direction longitudinally of the spindle, an operating rod slidable in the bore, said pins connected to said rod adapted to engage the ring and slide the ring on the spindle to move the jaws against the work, camming faces on the ring engaging the camming faces on the jaws, inserts removably connected to the work engaging faces of said jaws, and an adjustable stop on said spindle for fixing the position of the work within the spindle.

HENRY J. DUPHILY.

REFERENCES CITED

The following references are of record in the file of this patent:

UNITED STATES PATENTS

| Number | Name | Date |
|---|---|---|
| 2,357,424 | Preziosi et al. | Sept. 5, 1944 |
| 2,323,091 | Johnson et al. | June 29, 1943 |
| 127,793 | Putman | June 11, 1872 |
| 804,904 | Vaught | Nov. 21, 1905 |

FOREIGN PATENTS

| Number | Country | Date |
|---|---|---|
| 630,720 | Germany | Dec. 21, 1934 |